United States Patent
Steele

(10) Patent No.: US 6,464,440 B1
(45) Date of Patent: Oct. 15, 2002

(54) ANTI-SCRATCH COATING FOR A TIP OF AN AUTOMOTIVE FASTENER

(76) Inventor: Michael G. Steele, 1909 Clarence Street, Sarnia, Ontario (CA), N7X 1C8

( * ) Notice: Subject to any disclaimer, the term of this patent is extended or adjusted under 35 U.S.C. 154(b) by 0 days.

(21) Appl. No.: 09/502,861

(22) Filed: Feb. 11, 2000

Related U.S. Application Data

(60) Provisional application No. 60/119,741, filed on Feb. 12, 1999.

(51) Int. Cl.[7] ................................................ F16B 33/06
(52) U.S. Cl. ........................................ 411/378; 411/914
(58) Field of Search ................................ 411/903, 914, 411/378, 377, 386; 405/11

(56) References Cited

U.S. PATENT DOCUMENTS

| | | | |
|---|---|---|---|
| 1,581,096 A | | 4/1926 | Barnes |
| 2,712,261 A | * | 7/1955 | Anderson |
| 3,501,993 A | * | 3/1970 | Swenson .................... 411/393 |
| 4,692,080 A | | 9/1987 | Hyner et al. |
| 4,713,855 A | | 12/1987 | Hyner et al. |
| 5,193,958 A | * | 3/1993 | Day ............................ 411/914 |
| 6,074,147 A | * | 6/2000 | Shu ............................ 411/393 |

* cited by examiner

*Primary Examiner*—Flemming Saether
(74) *Attorney, Agent, or Firm*—Howard & Howard

(57) ABSTRACT

A process for making a fastener having a shank with a head and a flat tip. A polymeric coating is applied to the tip of the fastener. The coating forms a parabolic bubble and is subsequently cured. The bubble prevents damage to a decorative coating of a vehicle during installation of a component in which the fastener is utilized. The disclosure is further directed to the fastener which is produced by the process.

24 Claims, 2 Drawing Sheets

ANTI-SCRATCH COATING FOR A TIP OF AN AUTOMOTIVE FASTENER

RELATED APPLICATION

This application claims priority to and all the benefits of co-pending U.S. Provisional Patent Application Ser. No. 60/119,741 entitled "Anti-Scratch Coating For Automotive Fasteners", which was filed on Feb. 12, 1999.

BACKGROUND OF THE INVENTION

1. Field of the Invention

The present invention pertains to automotive fasteners. More particularly, the present invention pertains to automotive fasteners having a parabolic shaped coating adhered to the tip of the fastener to prevent scratching during installations and the process of producing the same.

2. Prior Art

There exists the need for an automotive fastener that can be used to attach automotive components to a vehicle without damaging the decorative coating that has been applied to the body of the vehicle.

During the assembly process, fasteners of the general type disclosed in this invention are welded to a bracket, such as a bumper mounting bracket, to allow attachment of various components to a vehicle body. The mounting bracket assemblies are commonly treated to prevent corrosion by processing with caustic and acid washes, with a subsequent electrodeposited paint coating.

During installation of the bracket assembly, the tips of the fasteners have been known to damage the decorative coating of the vehicle body. The damage is predominantly caused when a person attempts to install the bracket assembly at an angle other than perpendicular to a mounting hole. When attempting to install the bracket assembly at an angle, the fastener tip may be dragged across the vehicle body thereby scratching the decorative coating.

It is an object of this invention to provide a fastener having a parabolic shaped coating applied to the tip of the fastener to prevent scratching of the decorative coating of a vehicle during installation. It is a further object of this invention to provide a fastener having a parabolic shaped coating applied to the tip of the fastener, where the coating can withstand the welding and corrosion treatment outlined above.

Various fasteners having coatings are known, U.S. Pat. No. 4,692,080 entitled "Self Drilling Fasteners And Process For Making The Same", discloses a self-drilling screw having a frangible polymer coating on the screw tip. The coating is applied prior to applying a corrosion resistant plating to the screw for preventing the plating from being deposited upon the tips of the fasteners. The coating comprises a triallyl cyanurate which is ultra-violet or infrared curable. The coating breaks away from the fastener during the installation process, to expose the sharp self-drilling tip of the disclosed fastener.

The fastener of the above referenced patent does not provide a fastener having a parabolic shaped coating on the tip that will not break off during the installation process, thereby preventing the scratching of the decorative coating of the vehicle body.

U.S. Pat. No. 4,713,855 entitled "Process For Making Self-Drilling Fasteners", discloses a process for manufacturing the fasteners outlined in the previously referenced U.S. Pat. No. 4,692,080. The patent discloses a process for applying the frangible coating to the self-tapping screw tip which includes dipping the tip into a triallyl cyanurate polymer bath and subsequently curing the polymer using ultra-violet or infrared light.

The process of the above referenced patent does not provide a process for applying a coating to the tip of a fastener, to produce a parabolic shaped coating on the tip.

It is therefore, the purpose of the present invention to cure those deficiencies outlined above by providing a fastener and the process for producing the same, whereby the tip of the fastener has a parabolic shaped coating adhered to the tip of the fastener to prevent scratching of the decorative coating of a vehicle during installation.

SUMMARY OF THE INVENTION

Thus, in accordance with the present invention, there is provided a process for making a fastener having a shank with a head and a flat tip. A polymeric coating is applied to the flat tip to form a parabolic bubble on the tip of the fastener. The bubble is cured to prevent the tip of the fastener from damaging a decorative coating on a vehicle, such as during installation of the fastener.

The invention includes the several steps and the relationship of the several steps with respect to each other. The invention also includes the article produced by the process and its properties as disclosed in the following Detailed Description.

DETAILED DESCRIPTION OF THE PREFERRED EMBODIMENT

Figure 1:
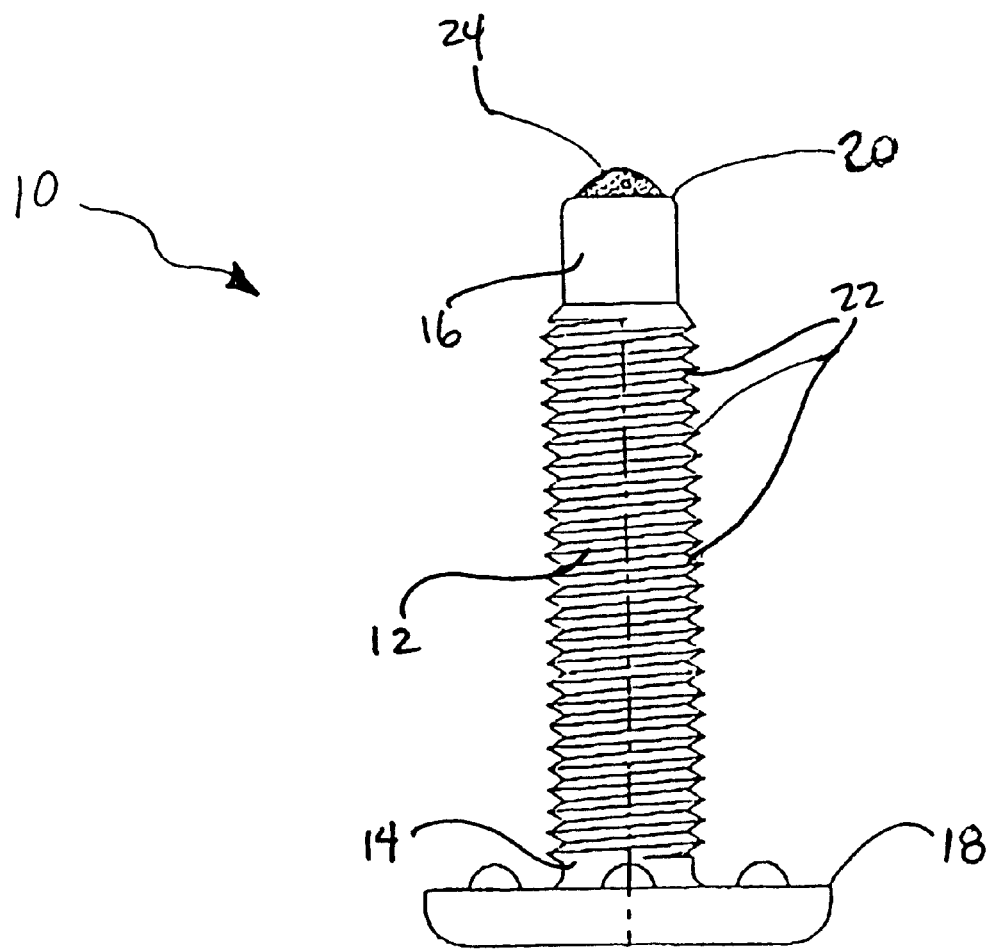
FIG. 1 is a side view of a fastener having a parabolic shaped coating on a tip.

Referring to the Figures, wherein like numerals indicate like or corresponding parts throughout the several views, a fastener for securing a component to a vehicle (not shown) is generally illustrated at 10 in FIG. 1. The component may be any suitable exterior trim piece or body panel which is secured to the vehicle. In addition, the component may be formed of plastic or metal as is desired.

The fastener 10 comprises a shank 12 having first 14 and second 16 ends. The shank 12 may be of any desired length or diameter as needed for a particular application. A head 18 is disposed on the first end 14 with the second end 16 terminating at a flat tip 20. The head 18 may be of any suitable shape and size such as circular or oval.

A majority of the shank 12 has a plurality of threads 22 extending between the head 18 and the tip 20. The threads 22 work in concert with a bolt or other like device (not shown) to secure the component to the vehicle. The entire fastener 10 is preferably formed of a metal material, such as steel, which can withstand typical oven temperatures. As appreciated, the threads 22 may be substituted for locking projections or the like. The important feature is that the fastener 10 adequately secures the component part to the vehicle.

The fastener 10 is characterized by a polymeric coating 24 disposed on the flat tip 20. The polymeric coating 24 forms a parabolic bubble 24 on the flat tip 20 for preventing scratching of the vehicle by the fastener 10 during installation of the component. In particular, the parabolic shaped coating 24 prevents the tip 20 from contacting the decorative coating of a vehicle body. The decorative coating is primarily the painted exterior body panel of the vehicle.

The thickness (or height) of the parabolic shaped coating 24 is directly proportional to the angle the fastener 10 can approach the vehicle body without the tip 20 scratching the decorative coating. For example, a 0.5 mm coating thickness prevents the tip 20 from contacting the vehicle body at a 24.5 degree approach, while a 2.5 mm thickness prevents the tip 20 from contacting the vehicle body at a 66.3 degree approach. A range of coating thickness can be applied to obtain a desired approach angle, whereby the tip 20 will not contact and scratch the decorative coating. The determined range includes:

| Thickness | Approach angle |
|---|---|
| 0.5 mm | 24.5 degrees |
| 0.75 mm | 34.5 degrees |
| 1.0 mm | 42.4 degrees |
| 1.5 mm | 53.8 degrees |
| 2.0 mm | 61.2 degrees |
| 2.5 mm | 66.3 degrees |

The parabolic shaped coating 24 is formed from a paint mixture comprising at least four components. The first component is a high solid polyurethane polymer dispersed in dispersing solvents Methyl ethyl Ketone, N-Butyl Acetate, and Methyl Amyl-Ketone. However, other dispersing solvents may be used as required. The polyurethane polymer can be purchased from Cardinal Industrial Finishes and is sold as High Solids Polyurethane.

The second component is a polyurethane catalyst. The catalyst comprises Hexamethane Diisocyanate, a free monomer, dispersed in dispersing solvent N-butyl acetate. However, other dispersing solvents may be used as required. The Hexamethane Diisocyanate causes the polyurethane to crosslink while curing in a bake oven. The catalyst can be purchased from Cardinal Industrial Finishes and is sold as 340HP Catalyst.

The third component is a pigment paste for adding color and inhibiting corrosion. Various pigments have been contemplated for use to meet various color requirements. A pigment known to meet color and corrosion requirements is Zinc Oxide. Zinc Oxide is wetted with Toluene and Aliphatic Naphtha forming the third component. This pigment can be purchased from Tremulad.

The fourth component is a hardening agent having Isopropanol. A higher concentration of the hardening agent in the final product hardens the coating and improves adhesion. The hardening agent reduces the affect of gravitational forces which cause the paint to flow during curing. Thus, a higher concentration of the hardening agent will yield a thicker (higher) coating. The hardening agent can be purchased from Sheffield Bronze Inc., and is known as Japan Dryer.

The preferred composition range for the four components is:

| Component | Range |
|---|---|
| One | 46%–66% |
| Two | 18%–34% |
| Three | 10%–20% |
| Four | 2%–8% |

The preferred target for operation for each component is:

| Component | Range |
|---|---|
| One | 65% |
| Two | 20% |
| Three | 10% |
| Four | 5% |

Another example of a target composition for the four components is:

| Component | Amount |
|---|---|
| One | 70% |
| Two | 15% |
| Three | 12% |
| Four | 3% |

Still another example of a target composition is:

| Component | Amount |
|---|---|
| One | 60% |
| Two | 25% |
| Three | 10% |
| Four | 5% |

Still another example is:

| Component | Amount |
|---|---|
| One | 55% |
| Two | 20% |
| Three | 20% |
| Four | 5% |

The paint mixture requires a three part blending process prior to application to the tip 20. First, components three and four are mixed together forming a first pre-mix. Second, components one and two are mixed together forming a second pre-mix. Shortly thereafter, the first pre-mix is blended with the second pre-mix over a two to five minute period under medium speed agitation forming the paint mixture.

Figure 2:
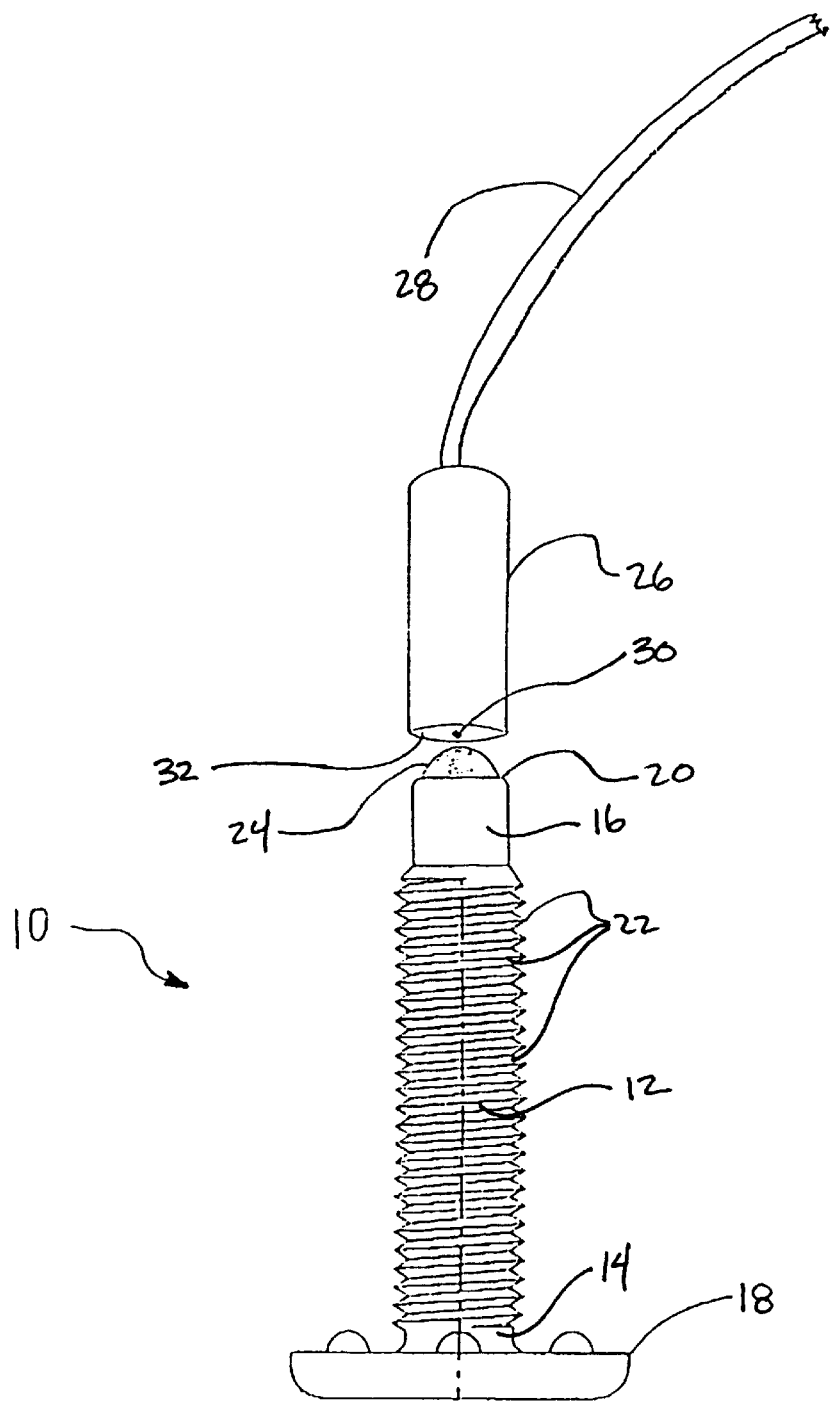
FIG. 2 is a side view of the fastener with an applicator for applying a paint bubble to the tip.

Referring to FIG. 2, an applicator 26 for applying the coating 24 is shown. The applicator 26 includes an infeed line 28 leading from an application tank (not shown). The applicator has a hole through 30 which is formed in a flat base 32. The applicator 26 preferably has a closed cylindrical configuration with the hole 30 disposed at the opposite end of the infeed line 28.

During application, the paint mixture is loaded into the application tank and maintained under agitation. A plurality of paint lines 28 lead from the application tank.

Each paint line 28 connects with a corresponding applicator 28 having a hole 30 through a flat base 32. While under pressure, the paint mixture is forced through the hole 30 which is in close proximity to the tip 20 forming a bubble on the tip 20. Prior to application, the tips 20 are cleaned via a solvent wipe. A plurality of fasteners 10 are held in a processing fixture (not shown) during paint application.

After application, the processing fixture is installed into a preheated oven for curing the paint and forming the bubble shaped coating 24. The oven curing cycle ranges from two hours at 450 degrees Fahrenheit to eight hours at 300 degrees Fahrenheit. While in the oven, the paint bubble cures into the parabolic shape of the coating 24. A higher oven temperature will yield a harder coating 24. The preferred oven curing cycle associated with the preferred range of operation includes oven curing for four hours at 425 degrees Fahrenheit.

The invention has been described in an illustrative manner, and it is to be understood that the terminology which has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A fastener for securing a component to a vehicle, said fastener comprising;
    a shank having first and second ends,
    a head disposed on said first end, and
    said second end terminating at a flat tip,
    said fastener characterized by a polymeric coating disposed on said flat tip and forming a parabolic bubble on said flat tip for preventing scratching of the vehicle by said fastener during installation of the component,
    wherein said polymeric coating is formed from a paint mixture comprising at least first, second, third and fourth components.

2. The fastener as set forth in claim 1 wherein said polymeric coating has a thickness from approximately 0.5 mm to approximately 2.5 mm.

3. The fastener as set forth in claim 1 wherein said first component is a high solids polyurethane polymer dispersed in dispersing solvents.

4. The fastener as set forth in claim 3 wherein said dispersing solvents are selected from a group consisting essentially of Methyl Ethyl Ketone, N-Butyl Acetate, and Methyl Amyl-Ketone.

5. The fastener as set forth in claim 1 wherein said second component is a polyurethane catalyst.

6. The fastener as set forth in claim 5 wherein said catalyst comprises Hexamethane Diisocyanate dispersed in N-Butyl Acetate.

7. The fastener as set forth in claim 1 wherein said third component is pigment paste for adding color and inhibiting corrosion.

8. The fasterner as set forth in claim 3 wherein said third component comprises Zinc Oxide, Toluene and Aliphatic Naphtha.

9. The fastener as set forth in claim 1 wherein said fourth component is a hardening agent having Isopropanol.

10. The fastener as set forth in claim 1 wherein said first component is approximately 46% to approximately 66% of said total paint mixture.

11. The fastener as set forth in claim 1 wherein said second component is approximately 18% to approximately 34% of said total paint mixture.

12. The fastener as set forth in claim 1 wherein said third component is approximately 10% to approximately 20% of said total paint mixture.

13. The fastener as set forth in claim 1 wherein said fourth component is approximately 2% to approximately 8% of said total paint mixture.

14. The fastener as set forth in claim 1 wherein said first component comprises approximately 65%, said second component comprises approximately 20%, said third component comprises approximately 10% and said fourth component comprises approximately 5% of said total paint mixture.

15. The fastener as set forth in claim 1 wherein said first component comprises approximately 70%, said second component comprises approximately 15%, said third component comprises approximately 12% and said fourth component comprises approximately 3% of said total paint mixture.

16. The fastener as set forth in claim 1 wherein said first component comprises approximately 60%, said second component comprises approximately 25%, said third component comprises approximately 10% and said fourth component comprises approximately 4% of said total paint mixture.

17. The fastener as set forth in claim 1 wherein said first component comprises approximately 55%, said second component comprises approximately 20%, said third component comprises approximately 20% and said fourth component comprises approximately 5% of said total paint mixture.

18. A fastener for securing a component to a vehicle without
    scratching the vehicle during installation of the component, said fastener comprising;
    a shank having first and second ends,
    a head disposed on said first end, and
    said second end terminating at a flat tip,
    said fastener characterized by a polymeric coating disposed on said flat tip and forming a parabolic bubble on said flat tip such that said parabolic bubble of said polymeric coating prevents said fastener from scratching the vehicle as the component is installed and wherein said polymeric coating is formed from a paint mixture comprising at least first, second, third and fourth components.

19. The fastener as set forth in claim 18 wherein said polymeric coating has a thickness from approximately 0.5 mm to approximately 2.5 mm.

20. The fastener as set forth in claim 18 wherein said first component is a high solids polyurethane polymer dispersed in dispersing solvents.

21. The fastener as set forth in claim 18 wherein said second component is a polyurethane catalyst.

22. The fastener as set forth in claim 18 wherein said third component is pigment paste for adding color and inhibiting corrosion.

23. The fastener as set forth in claim 18 wherein said fourth component is a hardening agent having Isopropanol.

24. The fastener as set forth in claim 18 wherein said first component comprises from 55 to 70%, said second component comprises from 15 to 25%, said third component comprises from 10 to 20%, and said fourth component comprises from 3 to 5%, of said total paint mixture.

* * * * *